(12) United States Patent
Murakami et al.

(10) Patent No.: US 7,619,673 B2
(45) Date of Patent: Nov. 17, 2009

(54) IMAGE SENSOR, DRIVING METHOD AND CAMERA

(75) Inventors: Masashi Murakami, Kyoto (JP); Masayuki Masuyama, Nagaokakyou (JP)

(73) Assignee: Panasonic Corporation, Osaka (JP)

( * ) Notice: Subject to any disclaimer, the term of this patent is extended or adjusted under 35 U.S.C. 154(b) by 1017 days.

(21) Appl. No.: 10/814,185

(22) Filed: Apr. 1, 2004

(65) Prior Publication Data

US 2004/0227833 A1    Nov. 18, 2004

(30) Foreign Application Priority Data

Apr. 4, 2003    (JP)    ............... 2003-102342

(51) Int. Cl.
*H04N 3/14*    (2006.01)
(52) U.S. Cl. ...................................... 348/308
(58) Field of Classification Search ................. 348/308
See application file for complete search history.

(56) References Cited

U.S. PATENT DOCUMENTS

| 6,271,685 | B1 * | 8/2001 | Nagasawa et al. | 326/113 |
|---|---|---|---|---|
| 6,369,853 | B1 * | 4/2002 | Merrill et al. | 348/302 |
| 6,512,543 | B1 * | 1/2003 | Kuroda et al. | 348/302 |
| 6,798,451 | B1 | 9/2004 | Suzuki et al. | |
| 6,975,357 | B1 | 12/2005 | Suzuki et al. | |
| 7,535,494 | B2 | 5/2009 | Suzuki | |
| 2003/0206235 | A1 | 11/2003 | Suzuki | |

FOREIGN PATENT DOCUMENTS

| EP | 0 293 156 | 11/1988 |
|---|---|---|
| JP | 06-030344 | 2/1994 |
| JP | 06-097408 | 4/1994 |
| JP | 2000-253314 | 9/2000 |
| JP | 2001-024946 | 1/2001 |
| JP | 2001-69408 | 3/2001 |
| JP | 2001-285720 | 10/2001 |
| JP | 2003-46879 | 2/2003 |
| WO | 01/17234 | 8/2001 |

* cited by examiner

*Primary Examiner*—David L Ometz
*Assistant Examiner*—Dillon Durnford-Geszvain
(74) *Attorney, Agent, or Firm*—Wenderoth, Lind & Ponack, L.L.P.

(57) ABSTRACT

An image sensor includes the following: a sensor unit being made up of a plurality of pixels; a scanning circuit having a dynamic logic circuit which outputs selection signals that select pixels from among the plurality of pixels in the sensor unit; and a bootstrap circuit that is placed between the scanning circuit and the sensor unit. The bootstrap circuit holds the selection signal outputted from the scanning circuit during one horizontal scanning period, and outputs, to the sensor unit, an AND signal obtained by operating a logical AND between the held selection signal and a drive signal that specifies a timing to output the AND signal to the sensor unit.

15 Claims, 12 Drawing Sheets

IMAGE SENSOR, DRIVING METHOD AND CAMERA

BACKGROUND OF THE INVENTION (1) Field of the Invention

The present invention relates to an image sensor comprising a sensor unit that is made up of a plurality of pixels and a plurality of scanning circuits, each of which has a dynamic logic circuit for outputting, with the use of different scanning methods, an output signal for selecting a row or a column in the sensor unit.

(2) Description of the Related Art

Recently, an image sensor using an amplifier-type MOS sensor has been developed. The image sensor is characterized by its high sensitivity and amplifies the signal detected by a photo diode for each cell indicating a pixel using a transistor.

A dynamic shift register is used as a circuit to scan horizontally or vertically a sensor unit which has pixels arranged two-dimensionally in such an image sensor as described above so as to enhance simplification, high integration and low power consumption of the circuit.

Figure 4:
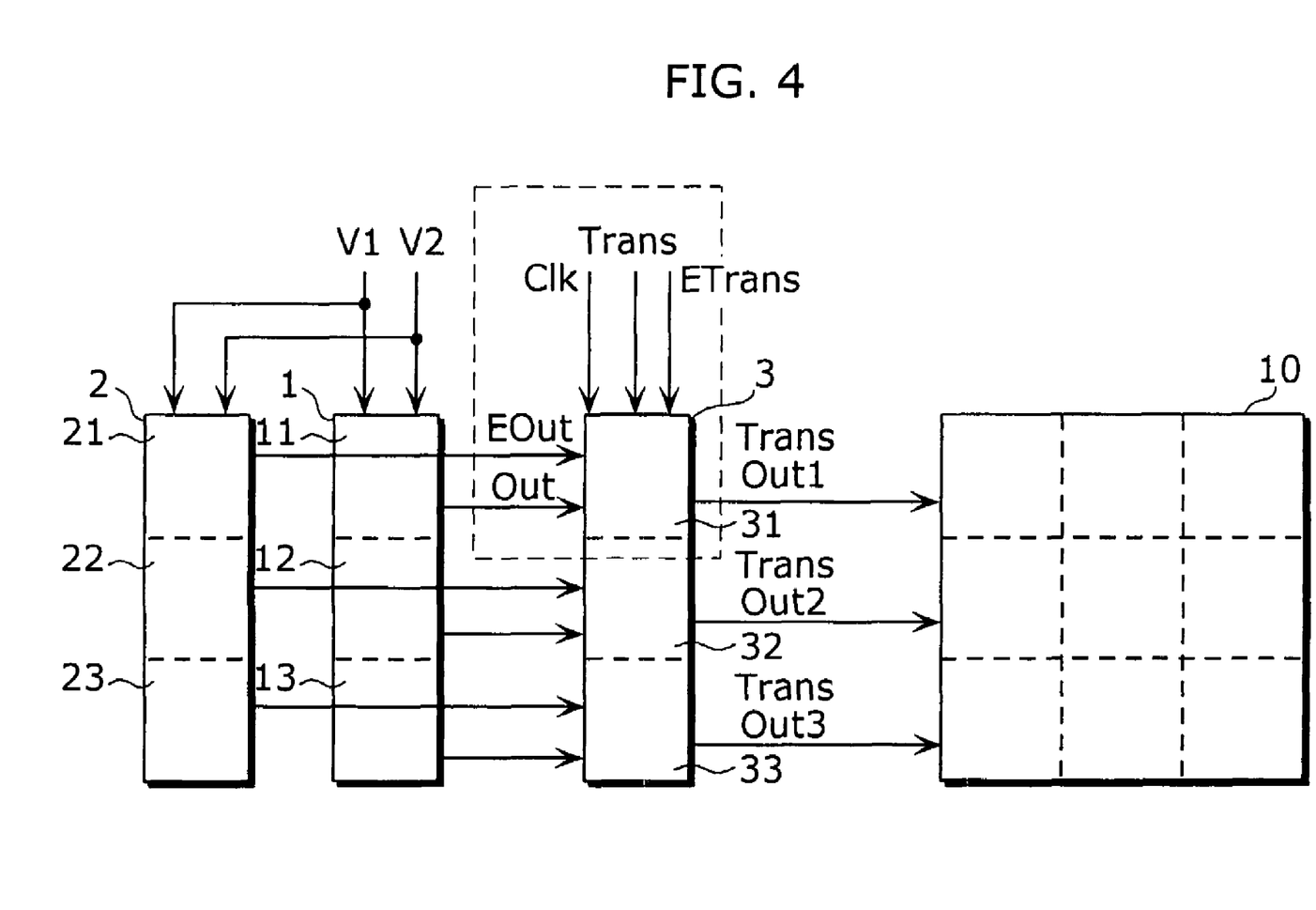
FIG. 4 shows a schematic structure of the main part of an image sensor according to a first embodiment.

The conventional image sensor that is published in Japanese Laid-Open Application No. 2003-46879 has, as shown in FIG. 4, a sensor unit 10 and a plurality of scanning circuits 1, 2 so as to realize, for example, an electronic shutter function. The scanning circuits 1 and 2 are shift registers, each of which is composed of plural stages of unit registers, and output to the sensor unit 10 an output signal for reading out a pixel signal at a desired timing. The output is through a wire connected electrically.

The electronic shutter function of the image sensor is to adjust a charge storage time of the image sensor by means of its drive, and control electrically an exposure time instead of a physical function of an aperture. In more detail, the electronic shutter function can be achieved by resetting a signal charge accumulated in each of the pixels at a timing different from that of reading out the pixel signal. For example, the scanning circuit 1 outputs a row selection signal to be used for reading out a normal pixel signal while the scanning circuit 2 outputs a row selection signal to be used for resetting by the electronic shutter function.

In the diagram, the signals V1 and V2 are two-phase clock signals, on which the shifting operation is based. The clock signal V1 is inputted into the unit registers arranged in "2N+1"th (where N is an integer) stages while the clock signal V2 is inputted into the unit registers arranged in "2N"th stages. Thus, the unit registers in "2N+1"th stages and those in "2N+1"th stages operate in alternate shifts. The Transout 1 signal is outputted as a logical OR of two output signals outputted from the unit register at the first stage in the scanning circuits 1 and 2. The Transout 2 and 3 signals are outputted in the same manner as the Transout 1, but the unit registers to which they correspond are different.

Figure 2A:
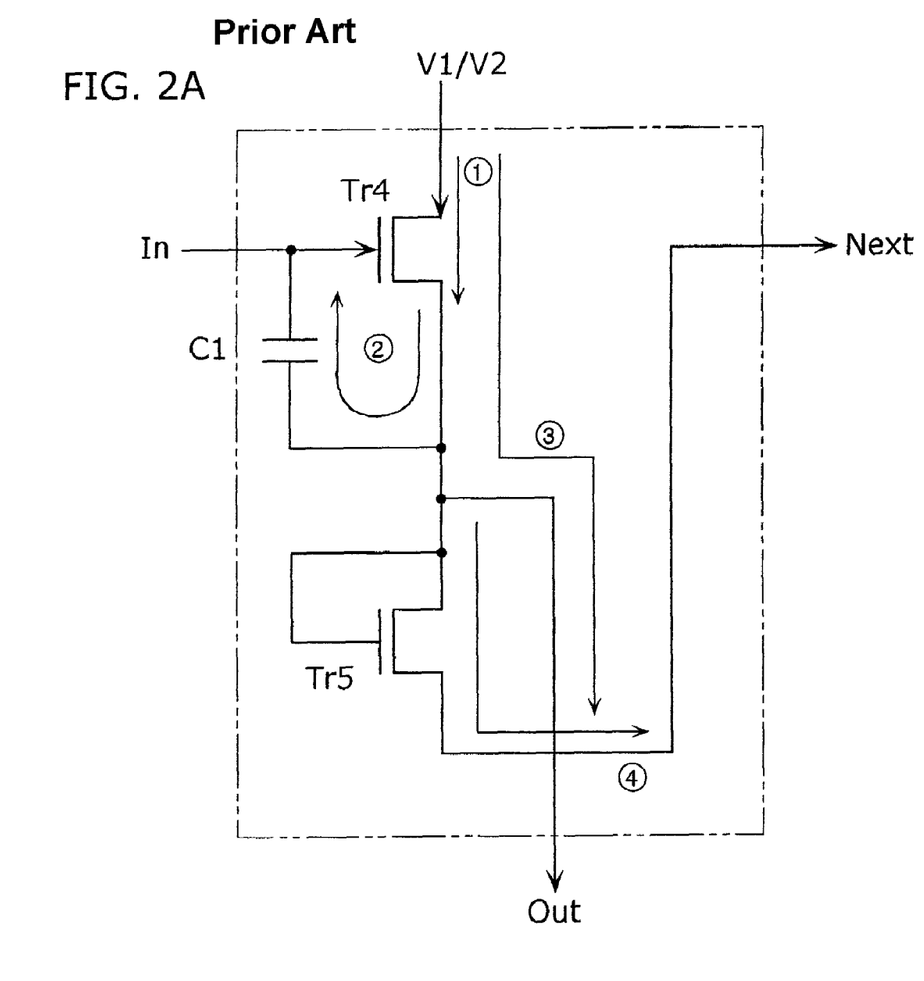

FIG. 2A is a block diagram showing a structure of the unit register. As shown in the diagram, the unit register is composed of the NMOS-type transistors Tr4, Tr5 and the capacitor C1. The two-phase clock signals (the clock signals V1 or V2) on which the shifting operation is based are provided for the unit registers.

Figure 2B:
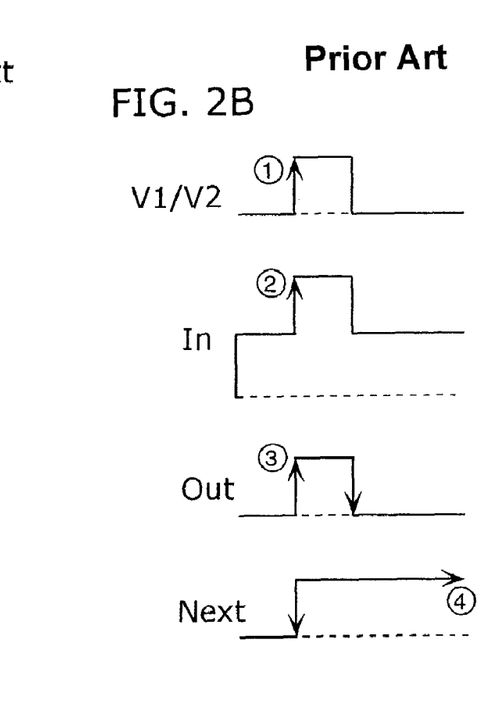
FIG. 2B shows an operation performed by the unit register.

FIG. 2B shows an operation performed by the unit register in a case where the input signal In is at a high level. Since the input signal In is at a high level, a gate electrode of the transistor Tr4 is already at a high level due to a gate capacitor of the transistor Tr4 and a potential of the capacitor C1, before the rising edge of the clock signals V1/V2 (①in the diagram). In this state, when the clock signals V1/V2 rise from a low level to a high level, a gate voltage In in the transistor Tr4 is boosted via the capacitor C1 (② in the diagram). The potential under a gate becomes higher than a high level of the clock signals V1/V2 since a voltage higher than the high level of the clock signals V1/V2 is applied to the gate of the transistor Tr4, and thereby, the Out signal is outputted at the high level as that of the clock signals V1/V2 (③ in the diagram). When the clock signals V1/V2 fall to a low state, the Out signal is outputted at the low level as that of the clock signals V1/V2. In this case, the Next signal is outputted at a high level even after the fall of the clock signals V1/V2 since the high level is maintained in the gate capacitor of the transistor Tr5 that is unidirectional.

In a case where the input signal In is at a low level (or floating), the boost transistor Tr1 is not ON, therefore, both the Out signal and the Next signal are held at a low level (or floating) even though the clock signal Clk is inputted to them.

The reason why the respective outputs from the unit registers in the scanning circuits 1, 2 are connected via wires is that the output lines, other than the one outputting a selection signal at high level, are in a floating state, in the case where the scanning circuits 1, 2 are composed of shift registers operated using NMOS dynamic logic circuit. The logical OR of the outputs can be obtained via the wire connection.

Also, in reading out a flip horizontal or flip vertical image, the image sensor has a structure in which multiple scanning circuits with different scanning directions are arranged and an access signal for scanning vertically or horizontally is outputted to the sensor unit 10 by a wire connecting the outputs electrically. The scanning circuit 1 outputs the row selection signal used for reading out a normal pixel signal while the scanning circuit 2 outputs the row selection signal used for inversely reading out in order to scan in a reverse direction.

The image sensor having multiple shift registers, each of which has an NMOS dynamic logic circuit, however, has the following problem.

Figure 3:
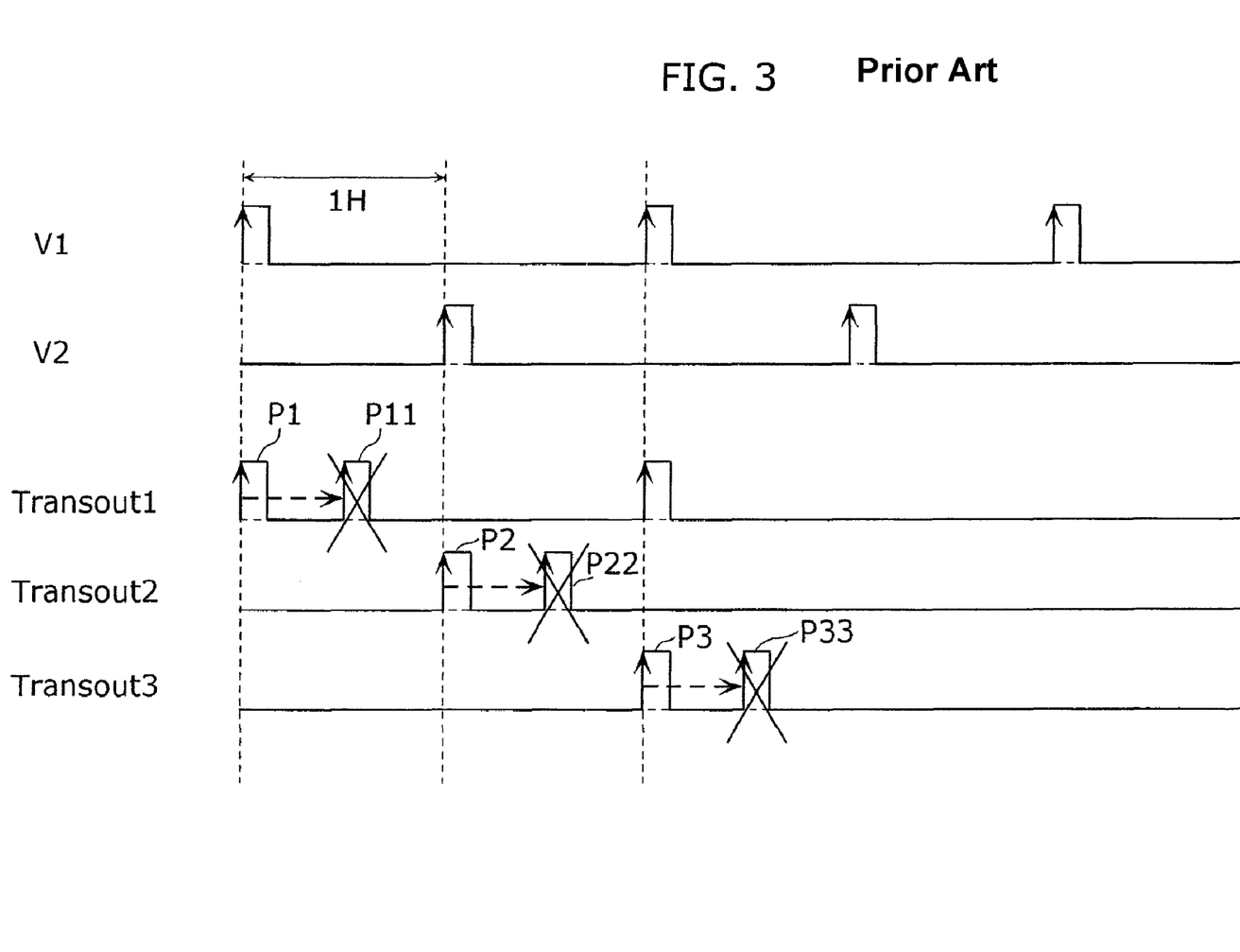
FIG. 3 shows an operation performed by a conventional image sensor.

The problem, which the present invention attempts to overcome, is explained with reference to FIG. 3.

The V1, V2 are the two-phase clock signals while Transout1~3 are signals respectively outputted to the sensor unit in correspondence with the first through third stages. The pulse P1 of the Transout 1 signal is generated when the clock signal V1 itself is outputted via the transistor Tr4. Similarly, the pulse P2 of the Transout 2 signal is generated when the clock signal V2 itself is outputted via the transistor Tr4 (in FIG. 2).

The Transout 3 signal and the Transout signals corresponding to the following stages are operated in the same manner.

Thus, a timing to output the pulse of a Transout signal is fixed according to the timing to output the pulse of the clock signal. It is therefore a problem that a Transout signal for electronic shutter use cannot be outputted at an arbitrary timing, for instance, the timings of P11, P22 and P33 shown in the diagram, within one horizontal period of time (1H in the diagram).

SUMMARY OF THE INVENTION

An object of the present invention, in view of the above problem, is to provide an image sensor which has a scanning circuit for electronic shutter use, for outputting an output signal in order to select pixels in a row or in a column of the sensor unit using a dynamic logic circuit, and can output the output signal at an arbitrary timing during a horizontal scanning period, a driving method thereof and a camera therewith.

The image sensor according to the present invention in order to achieve the above object comprises: a sensor unit that is made up of a plurality of pixels; a scanning circuit having a dynamic logic circuit for outputting selection signals that select pixels from among said plurality of pixels in the sensor unit; and a bootstrap circuit placed between the scanning circuit and the sensor unit, for holding a selection signal outputted from the scanning circuit during one horizontal scanning period, and outputting, to the sensor unit, an AND signal obtained by performing a logical AND between the held selection signal and a drive signal that specifies a timing to output the AND signal to the sensor unit.

According to this structure, the selection signal outputted from the scanning circuit is held during one horizontal scanning period so that the timing to apply the drive signal that specifies the timing to output the AND signal to the sensor unit can be arbitrary within the horizontal scanning period, without restriction. During the horizontal scanning period, the AND signal can be outputted as a pixel selection signal that is, for instance, for electronic shutter use.

Here, the bootstrap circuit may include: a switch connected to a selection signal line from the scanning circuit; a boosting transistor for holding said selection signal in a gate capacitor; and a capacitative element for boosting a gate voltage in the boosting transistor, wherein the boosting transistor holds said selection signal in the gate capacitor by an input of said selection signal to a gate of the boosting transistor via the switch, and outputs said AND signal from one of either a drain or a source to the sensor unit by an input of said drive signal to the other of the drain or source. The selection signal outputted from the scanning circuit may be at a high level during said one horizontal scanning period even while the gate capacitor holds said selection signal. In this case, the scanning circuit outputs said selection signal at a high level during said one horizontal scanning period by use of a drive pulse that is at a high level during said one horizontal scanning period.

The switch may be also a switching transistor, and a threshold of the gate voltage to turn on the switching transistor is smaller than a threshold of the gate voltage to turn on the boosting transistor.

According to this structure, the boosting transistor sets a high threshold so as to continue to shield the drive signal until the high level signal is boosted in the gate, while the switching transistor sets a low threshold so that the boosting transistor is easily switched on by the selection signal outputted from the scanning circuit. Consequently, this structure is practical to lower the power supply in the image sensor. Namely, low voltage operations with small voltage margin can be realized.

Here, the switch may transmit said selection signal to the gate of the boosting transistor when said switch is turned on at a time when one horizontal scanning period shifts to another horizontal scanning period. The scanning circuit may output said selection signal as a pulse having an arbitrary width during said one horizontal scanning period, by use of a drive pulse having said arbitrary width.

The switch may also be a switching transistor that is always on, and the scanning circuit outputs said selection signal as a pulse having an arbitrary width during said one horizontal scanning period, by use of a drive pulse having said arbitrary width.

According to this structure, the boosting transistor is boosted by the drive signal when the selection signal is at a high level. The threshold of the switching transistor can be therefore reduced even more, which enables a low power supply in the image sensor.

Here, the capacitative element is a gate capacitor of an enhancement-type transistor in which the drain and the source are short-circuited.

According to this structure, the boosting operation performed by the boosting transistor can be controlled more surely in the case where the output signal outputted from the scanning circuit is at a low level.

A camera which is equipped with the image sensor and employs a driving method employed by the image sensor has the same units, operations, and effects as those described above.

According to the image sensor of the present invention as described above, the timing to apply the drive signal for electronic shutter use can be arbitrary within one horizontal scanning period of time without any restriction and the pixel selection signal for electronic shutter use can be arbitrary within one horizontal scanning period of time. Furthermore, the image sensor is applicable for a low voltage in the power supply, that is to say, low voltage operation with less voltage margin is made possible. In this way, the boosting operation in the boosting transistor can be surely controlled in the case where the output signal outputted from the scanning circuit is at a low level.

For further information about technical background to this application, Japanese Patent Application No. 2003-102342 filed on Apr. 4, 2003, is incorporated herein by reference.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A is a block diagram showing the structure of a unit register while

FIG. 6A shows a part of the structure in the unit selection circuit while

FIG. 8A is a diagram showing a part of the structure in the unit selection circuit according to a second embodiment while

DESCRIPTION OF THE PREFERRED EMBODIMENT(S)

The embodiments of the present invention describe an image sensor which is incorporated in a cell phone, a Personal Digital Assistant or a camera.

First Embodiment

Figure 1:
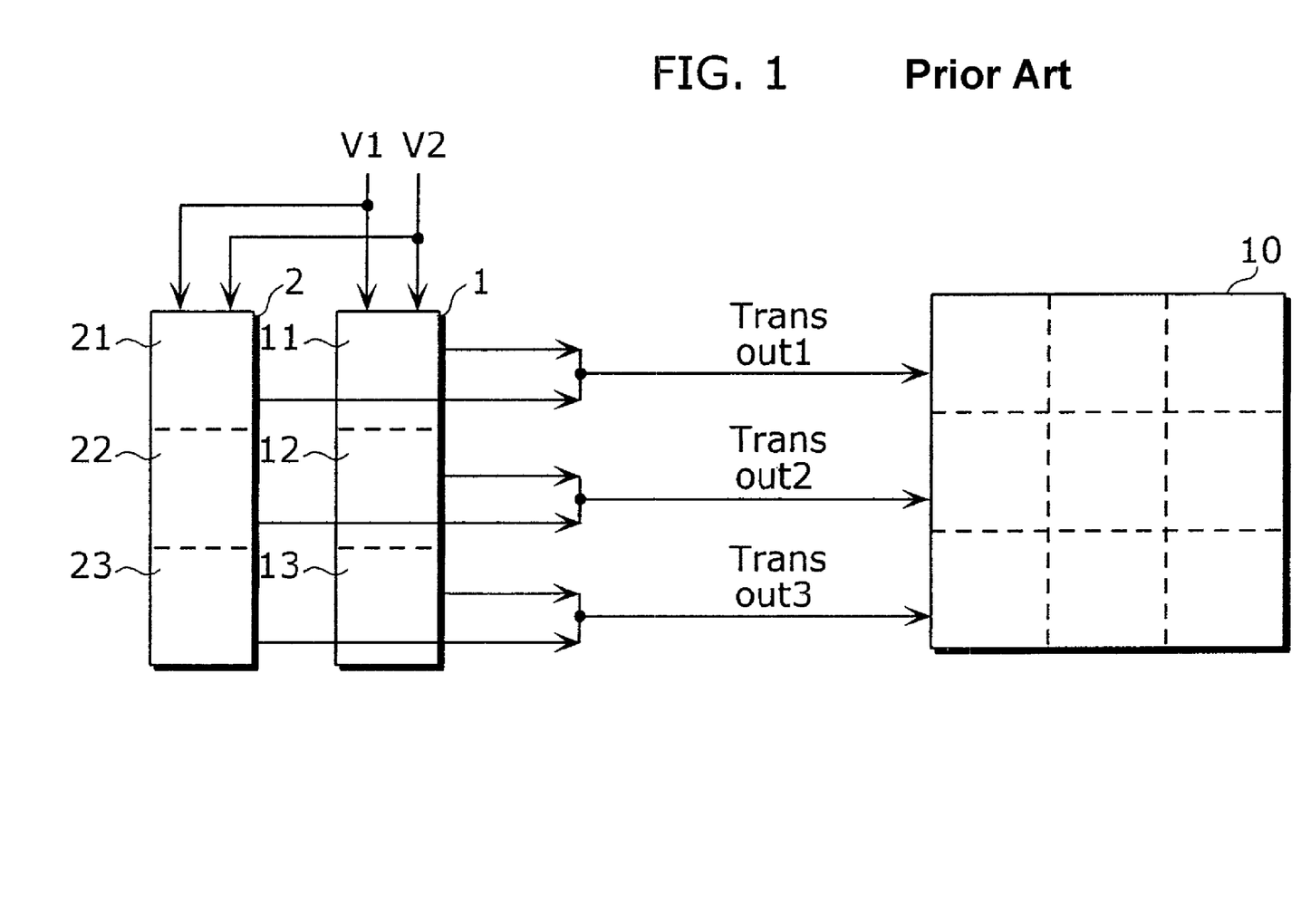
FIG. 1 shows a schematic structure of the main part of a conventional image sensor.

FIG. 4 is a sketchy diagram showing the main part of the image sensor according to the first embodiment of the present invention. The image sensor is composed of: a scanning circuit 1 for performing normal scanning; a scanning circuit 2 for performing scanning for electronic shutter use; a selection circuit 3 for selecting an output signal outputted from the scanning circuits 1, 2, and outputting it at an arbitrary timing; and the sensor unit 10 being made up of a plurality of pixels. The scanning circuits 1, 2 and the sensor unit 10 are as same as those described in FIG. 1 and the structure of the unit register constituting the scanning circuits 1, 2 is as same as the one described in FIG. 2A, therefore, the descriptions are omitted here. The TRANS and ETRANS signals in FIG. 1 are control signals for specifying the output signal outputted from the scanning circuits 1, 2 as well as the timing to output the output signal.

The selection circuit 3 holds the output signal Out outputted from the scanning circuit 1 and outputs the held output signal Out as a TRANSOut signal at a pulse timing of the TRANS signal. The selection circuit 3 also holds the output signal EOut outputted from the scanning circuit 2 and outputs the held EOut signal as a TRANSOut signal at a pulse timing of the held EOut signal. The selection circuit is composed of a plurality of unit selection circuits (the part surrounded with a dotted line is a unit selection circuit 31). Each of the unit selection circuits outputs selectively, at the pulse timing of the TRANS, ETRANS signals, either the output signals Out or EOut which are outputted from the scanning circuits 1, 2.

Figure 5A:
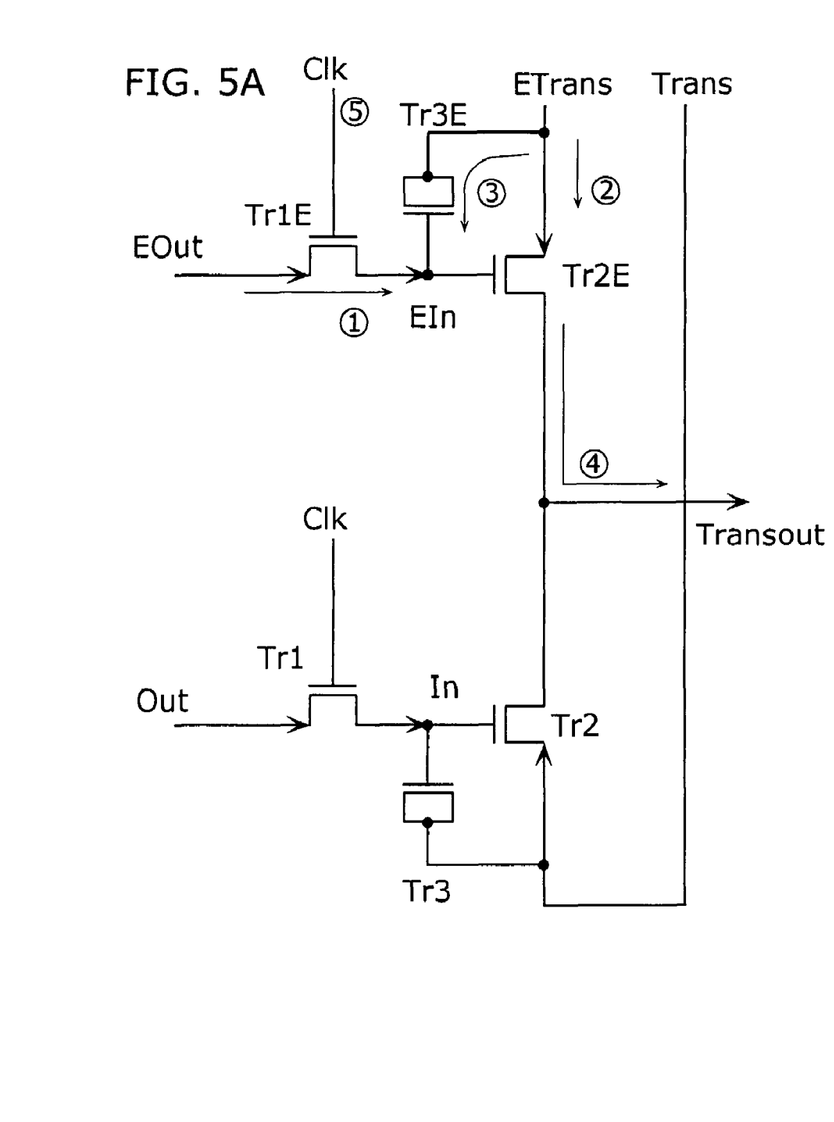
FIG. 5A is a circuit diagram showing the structure of the unit selection circuit.

FIG. 5A is a circuit diagram showing the structure of the unit selection circuit 31. As shown in the diagram, the unit selection circuit is composed of two bootstrap circuits, for holding the output signal EOut outputted from the unit register 21 in the scanning circuit 2 as well as the output signal Out outputted from the unit register 11 in the scanning circuit 1 and outputting selectively one of the held signals. The bootstrap circuit adapted for the output signal EOut is composed of a switching transistor Tr1E for controlling an input of the output signal EOut, a boosting transistor Tr2E for holding the inputted output signal, and an enhancement-type transistor Tr3E as a boost capacitor. Similarly, the bootstrap circuit adapted for the output signal Out is composed of the transistors Tr1, Tr2 and Tr3. The enhancement-type transistor Tr3E as a boost capacitor connects a source with a drain so as to connect them with the ETrans signal line and connects a gate with the gate of the boosting transistor Tr2E. The enhancement-typed transistor is characterized by its operation: it does not function as a boost capacitor without conduction when a gate voltage is less than or equal to the threshold, but functions as such when the gate voltage goes beyond the threshold.

Figure 5B:
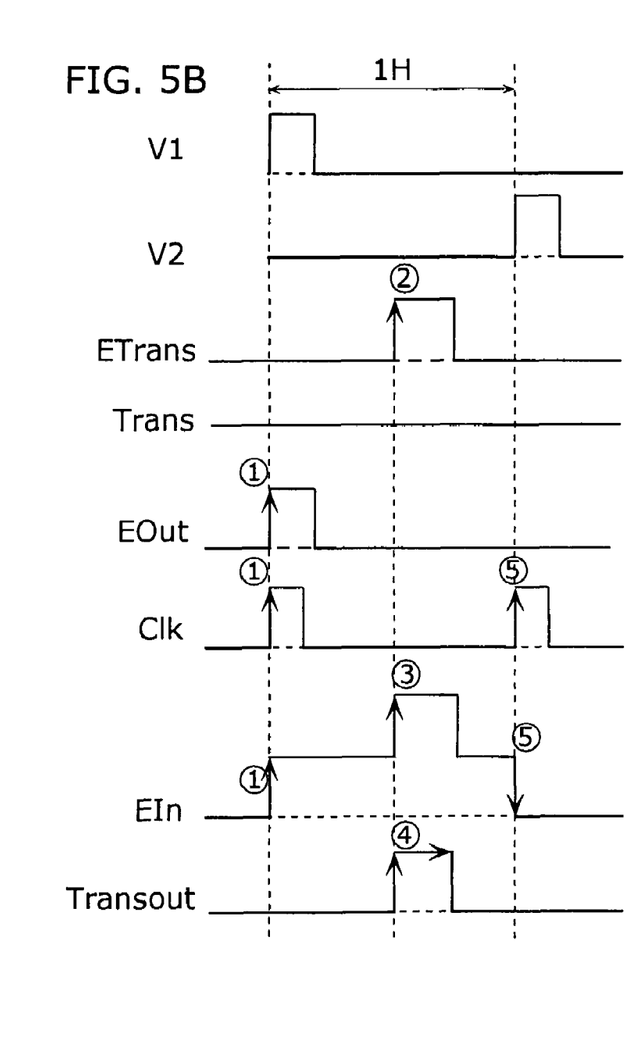
FIG. 5B is a time chart showing operational timings carried out in the unit selection circuit.

FIG. 5B is a time chart showing the operational timings in the unit selection circuit 31. The diagram shows the clock signals V1, V2, the ETrans signal, the Trans signal, the EOut signal, and the Clk signal to be inputted to the gates of the Transistors Tr1 and Tr1E, the gate signal EIn of the boosting transistor Tr2E, the output signal EOut outputted from the unit register 21, and the output signal Transout outputted from the unit selection circuit 31 to the sensor unit 10, in the case where only the EOut signal out of the output signals Out and EOut, rises to high level. It should be noted that the Clk signal is a signal having a pulse stream that is synchronous with the both pulses of the clock signals V1 and V2, as shown in the diagram.

The output signal EOut outputted from the unit register 21 becomes synchronous with the clock signal V1 and rises to a high level (① in the diagram). In this case, the clock signal being at a high level, the switching transistor Tr1E is ON and the output signal EOut at a high level is inputted to the gate of the boosting transistor Tr2E via the switching transistor Tr1E. Thus, the gate capacitor of the boosting transistor Tr2E holds the inputted high level signal and continues to hold the high level signal (hereinafter to be referred to as EIn signal), even after the clock signal Clk falls to a low level and the switching transistor Tr1E is OFF. The EIn signal is at a high level mostly through one horizontal scanning period (1H) until the clock signal Clk is ON and the level of the gate electrode of the boosting transistor Tr2E is made low.

Since the boosting transistor Tr2E is ON and the ETrans signal is at a high level within one horizontal scanning period (② in the diagram) due to the EIn signal, the EIn signal is boosted by a voltage higher than the level of the EIn signal via the gate capacitor of the enhancement-typed transistor Tr3E, and the pulse of the ETrans signal is outputted as a Transout signal via the boosting transistor Tr2E (④ in the diagram).

After that, when the clock signal Clk rises to a high level (⑤ in the diagram), the switching transistor Tr1E is switched ON, the gate electrodes of the boosting transistor Tr2E and the enhancement-type transistor Tr3E fall to a low level due to the EOut signal at a low level, and then the EIn signal is reset (low level).

Figure 6A:
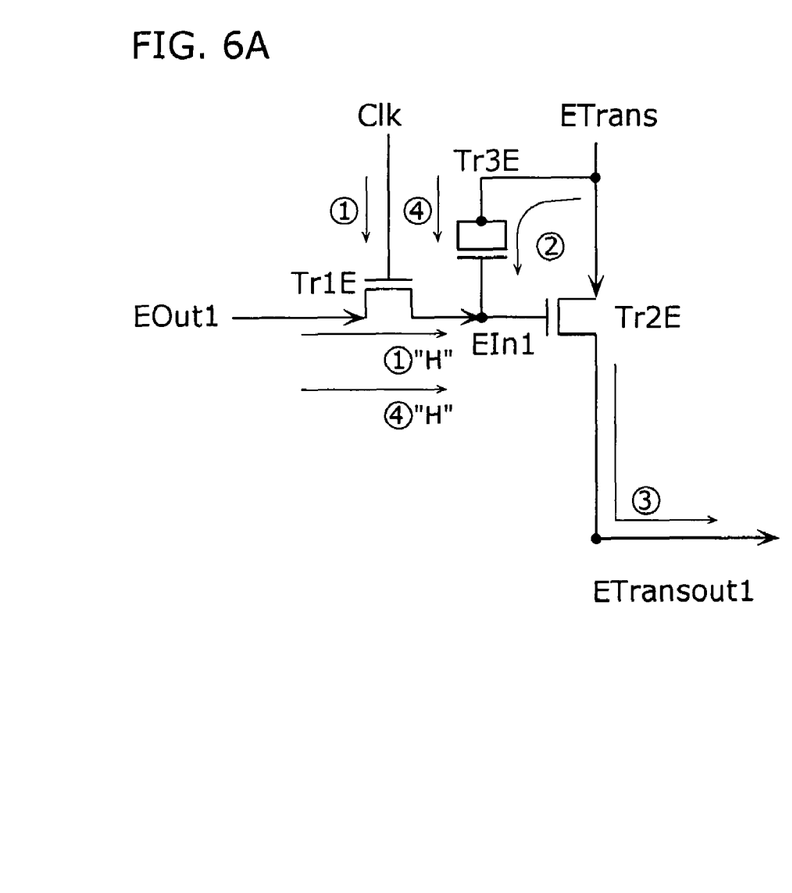
Figure 6B:
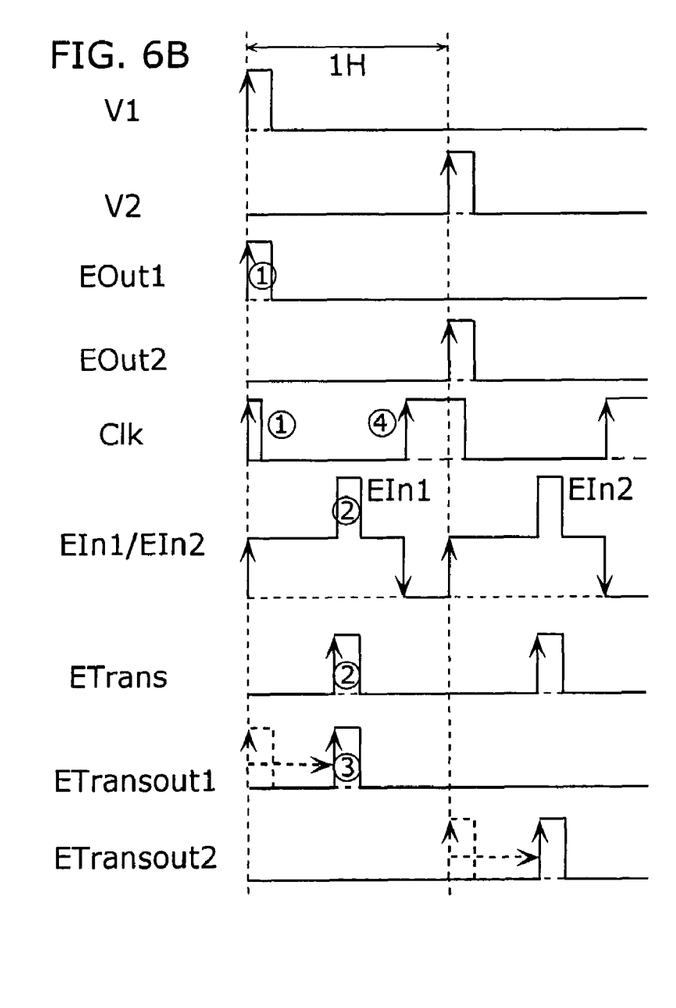
FIG. 6B is a time chart showing the operational timings.

FIG. 6A shows a half of the structure in the unit selection circuit while FIG. 6B is a time chart showing the operational timings carried out in the unit selection circuits 31, 32. The EOut1 and EOut2 in the diagram are the output signals outputted from the unit registers 21, 22 for the respective unit selection circuits 31, 32. The EIn1 and EIn2 indicate a potential of the gate capacitor of the boosting transistor Tr2E in the respective unit selection circuits 31, 32.

As shown in FIG. 6B, the output signals EOut1 and EOut2 are synchronous with the pulses of the clock signals V1, V2 so that they are at high level only with the same pulse duration as that of the clock signals V1, V2. In contrast, the signals EIn1 and EIn2 rise to a high level mostly through one horizontal scanning period. This is due to the following facts: 1) the EOut 1, 2 at a high level are let through the gate electrode of the boosting transistor Tr2E since the switching transistor Tr1E is ON due to the clock signal Clk; 2) the gate electrode of the boosting transistor Tr2E and the EOut1, EOut2 are shielded since the switching transistor Tr1E is OFF (low level between ① and ④); and 3) the gate electrode of the boosting transistor Tr2E is reset to a low level of the EOut1 and EOut2 since the switching transistor Tr1E is ON (④ in the diagram).

Therefore, since the output signals EIn1 and EIn2 are at a high level mostly through one horizontal scanning period, the pulse of the ETrans signal can be applied at an arbitrary timing within one horizontal scanning period. In this way, the ETrans signal (② in the diagram) is a selection control signal for controlling the output of the output signal EOut from the scanning circuit 2 as well as for setting an arbitrary timing to output the ETransout signal (③ in the diagram) as a selection signal for the sensor unit 10. For example, the timing to output the pulse of the ETransout signal is not restricted to any position on the dotted line, but may be any position on the actual line. Thus, it is possible to operate an electronic shutter within one horizontal scanning period.

In the case where the power supply is high (e.g., 12V, 5V, or the like), as has been the conventional case, the threshold of the gate voltage for turning on the transistors Tr2E and Tr1E can be the same voltage as the power supply. However, in the case where the power supply is low (e.g., 3V, 2.5V, or the like) as in the case where the image sensor is mounted on a cell phone or the like, the voltage margin is small. It is therefore desirable that the threshold of the boosting transistor Tr2E is high while the threshold of the switching transistor Tr1E is low.

Figure 7A:
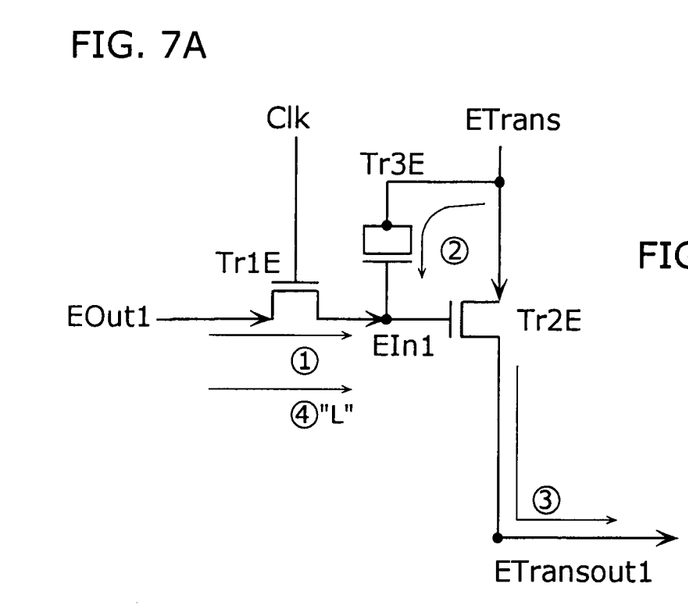
FIG. 7A~7C are diagrams showing a threshold for the operation in which low voltage is applied.
Figure 7B:
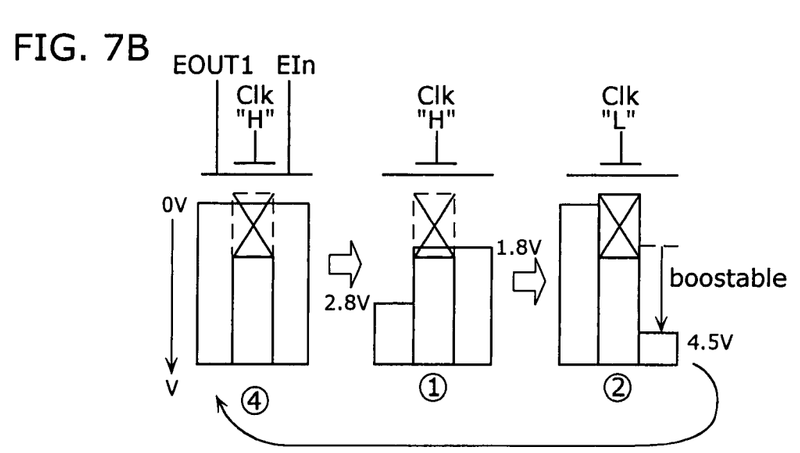
Figure 7C:
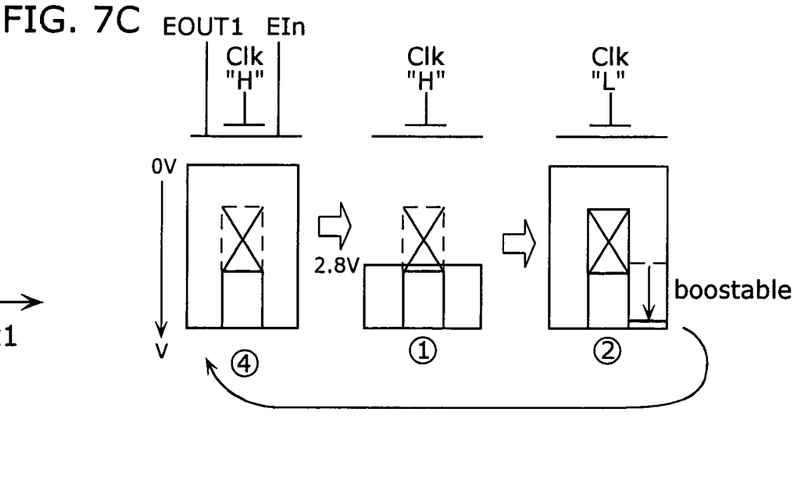

FIGS. 7A~7C are illustrations to show a threshold for the operation where low voltage is applied.

In the case where the ETransout signal of the boosting transistor Tr2E is outputted mistakenly during the accumulation of the signals operated by the sensor unit 10, a non-selection pixel is selected as a result. Due to this, the pixel signals which are presently accumulated fail to be accumulated, and thereby, picture quality is degraded. It is therefore desirable that the boosting transistor Tr2E has a high threshold so as to shield the ETrans signal until a high level signal that is high enough is inputted to the gate.

In the case where the threshold of the boosting transistor Tr2E is high, a high voltage needs to be applied to In so as to turn on the boosting transistor Tr2E at the time of selecting pixels. Namely, it is necessary that the switching transistor Tr1E has a low threshold for the operation where low voltage is applied.

However, another problem arises if the threshold of the transistor Tr1 is too low. This is explained with reference to FIGS. 7B and 7C.

FIGS. 7B and 7C are pattern diagrams respectively showing the potential of the switching transistor Tr1E. FIG. 7C shows the case where the threshold is too low compared to FIG. 7B. Here, the case of using a power supply of 2.8 V is described.

FIGS. 7B and 7C show a pattern of the potential when the clock signal Clk changes from high level to low level (④→①→② shown in the diagram). In FIG. 7B, the operation of the switching transistor Tr1E is OFF (not ON between the source and the drain), therefore, the boosting operation can be performed (① ② in the diagram).

In FIG. 7C, however, the switching transistor Tr1E operates in a strong-inversion state (completely ON between the source and the drain), therefore, the boosting operation cannot be performed (① ② in the diagram). That is to say, when the threshold of the transistor Tr1 is too low for the low-voltage operation, as shown in FIG. 7C, the source and the drain in the switching transistor Tr1E are connected when the held signal is boosted at the timing shown in ②. Consequently, it is difficult to perform low-voltage operation since the boosting operation cannot be performed.

Therefore, it is desirable that the boosting transistor Tr2E has a high threshold while the switching transistor Tr1E has a low threshold within the range where the boosting operation can be performed.

As described above, with the image sensor according to the first embodiment, the selection signal can be outputted to the sensor unit 10 for the use of an electrical shutter at an arbitrary timing within one horizontal scanning period. Also, low voltage in the power supply can be attained by setting the threshold of the boosting transistor Tr2E as higher than that of the switching transistor Tr1E.

Second Embodiment

The present embodiment will describe an image sensor which overcomes the problem caused by the threshold of the switching transistor Tr1E that is too low, as mentioned in the first embodiment. The structure of the image sensor is the same as the one shown in FIG. 4 and the structure of the unit selection circuit is as same as the one shown in FIG. 5A, so those descriptions are omitted here. The image sensor according to the present embodiment differs from the one described in the first embodiment in the respect that the pulse duration of the clock signals V1 and V2 are widened to make up a great part of one horizontal period.

Figure 8A:
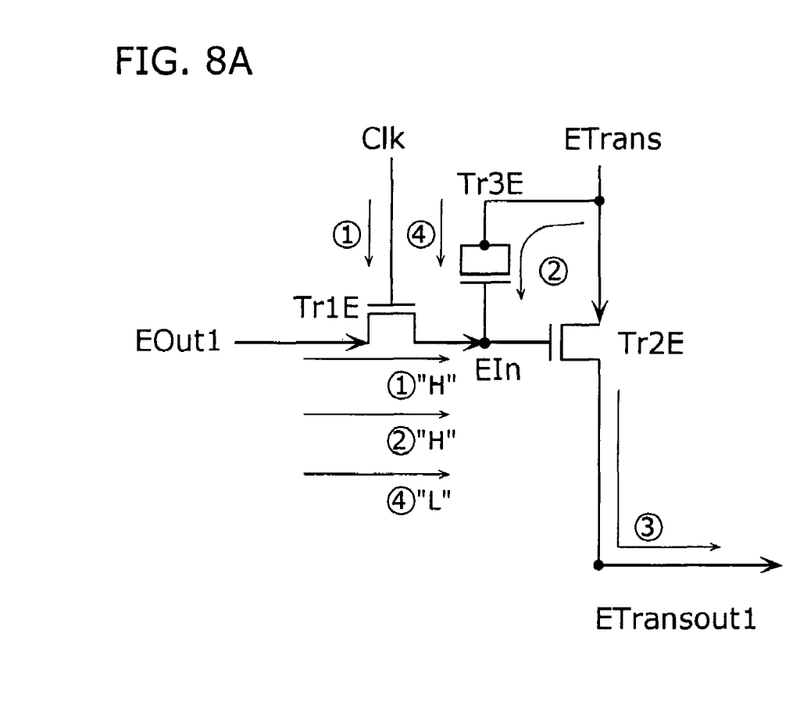
Figure 8B:
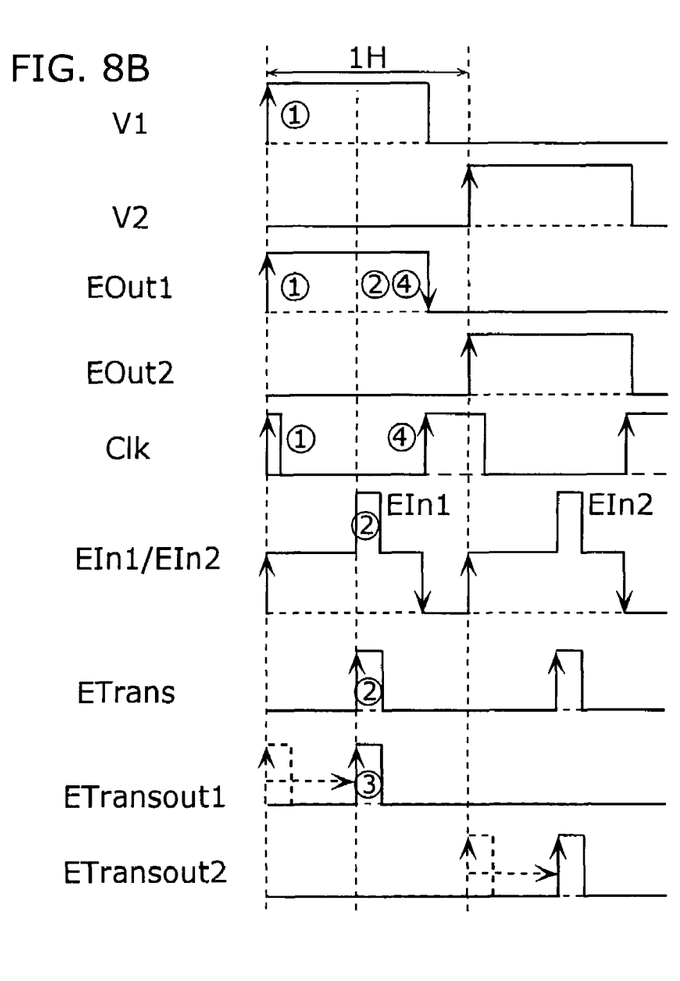
FIG. 8B is a time chart showing the operational timings.

In FIGS. 8A and 8B, the output signal EOut at a high level is held in the gate capacitor of the boosting transistor Tr2E with the timing shown in ①. The voltage is applied to the pulse ETrans so that the output signal EOut is outputted with the timing shown in ②. Here, since the output signal EOut is held at a high level, the source and drain of the switching transistor Tr1E are not ON completely. This enables the boosting operation in the boosting transistor Tr2E, and the selection signal Transout is outputted to the sensor unit 10.

Figure 9A:
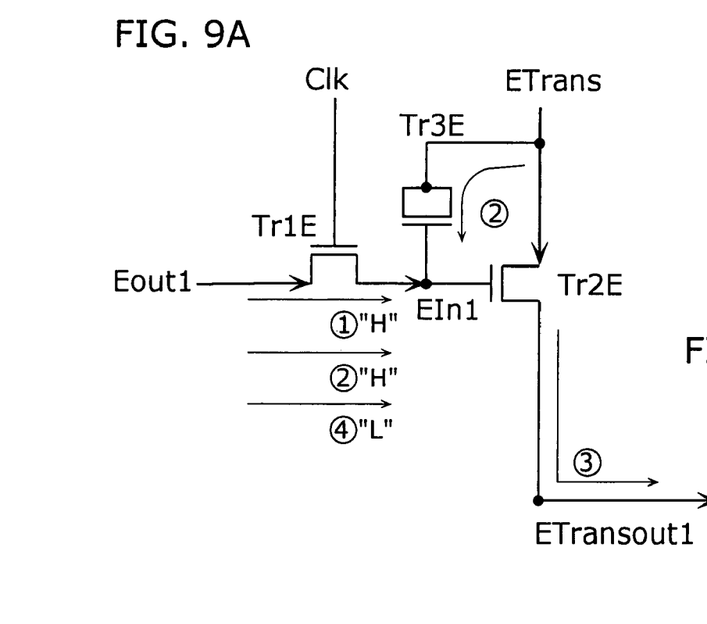
FIG. 9A~9C are diagrams showing a threshold for the operation in which low voltage is applied.
Figure 9B:
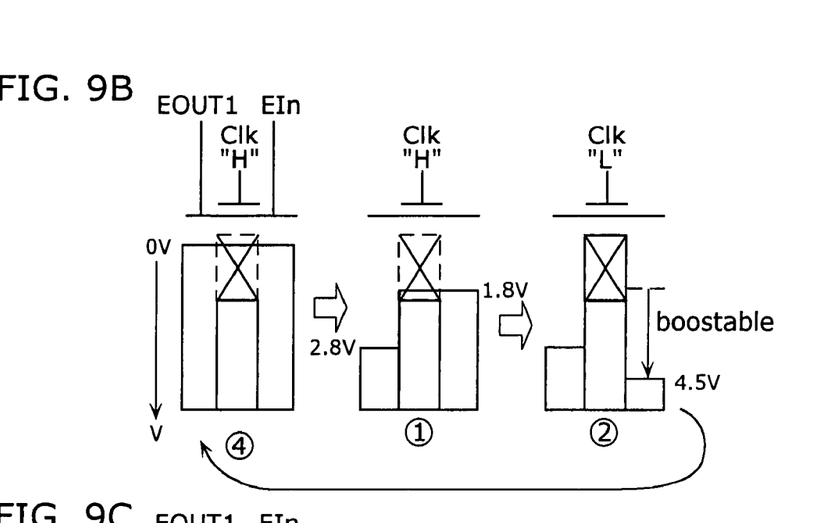
Figure 9C:
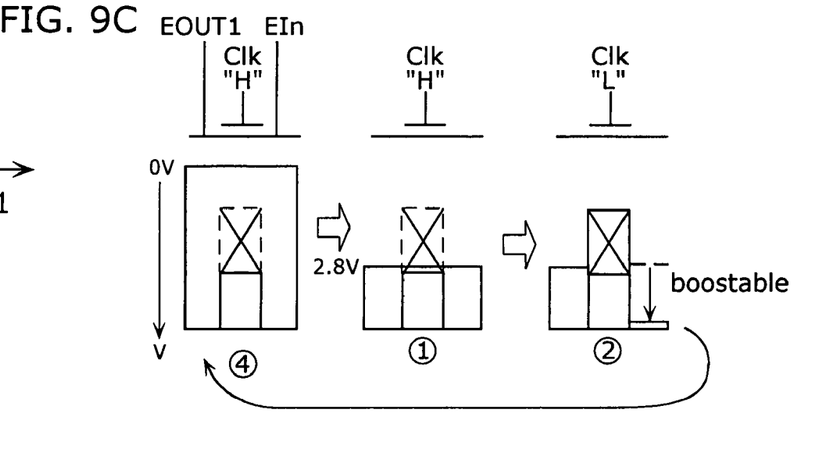

FIGS. 9A~9C are illustrations showing a threshold in the case of low-voltage operation. It is desirable that the boosting transistor Tr2E has a high threshold as shown in FIGS. 7A~7C.

FIGS. 9B and 9C are pattern diagrams showing the potential of the switching transistor Tr1E in the case where the threshold is lower in FIG. 9C than in FIG. 9B.

In FIG. 9B, the switching transistor Tr1E is OFF (not ON between the source and the drain) so that the boosting operation can be performed (① ② in the diagram).

In FIG. 9C, since the clock signal is at a low level and the output signal EOut is at a high level during the boosting operation, the switching transistor Tr1E is OFF, and therefore, the boosting operation can be performed.

Therefore, the image sensor according to the second embodiment, in which the boosting transistor Tr2E has a high threshold and the switching transistor Tr1E has a low threshold, prevents the problem that the boosting cannot be operated since the threshold of the switching transistor Tr1E is too low.

As is described above, with the image sensor according to the second embodiment, the selection signal for electronic shutter use can be outputted, to the sensor unit 10, at an arbitrary timing within one horizontal scanning period. Also, low power supply voltage can be facilitated by setting the threshold of the boosting transistor Tr2E higher than the threshold of the switching transistor Tr1E.

Third Embodiment

Figure 10:
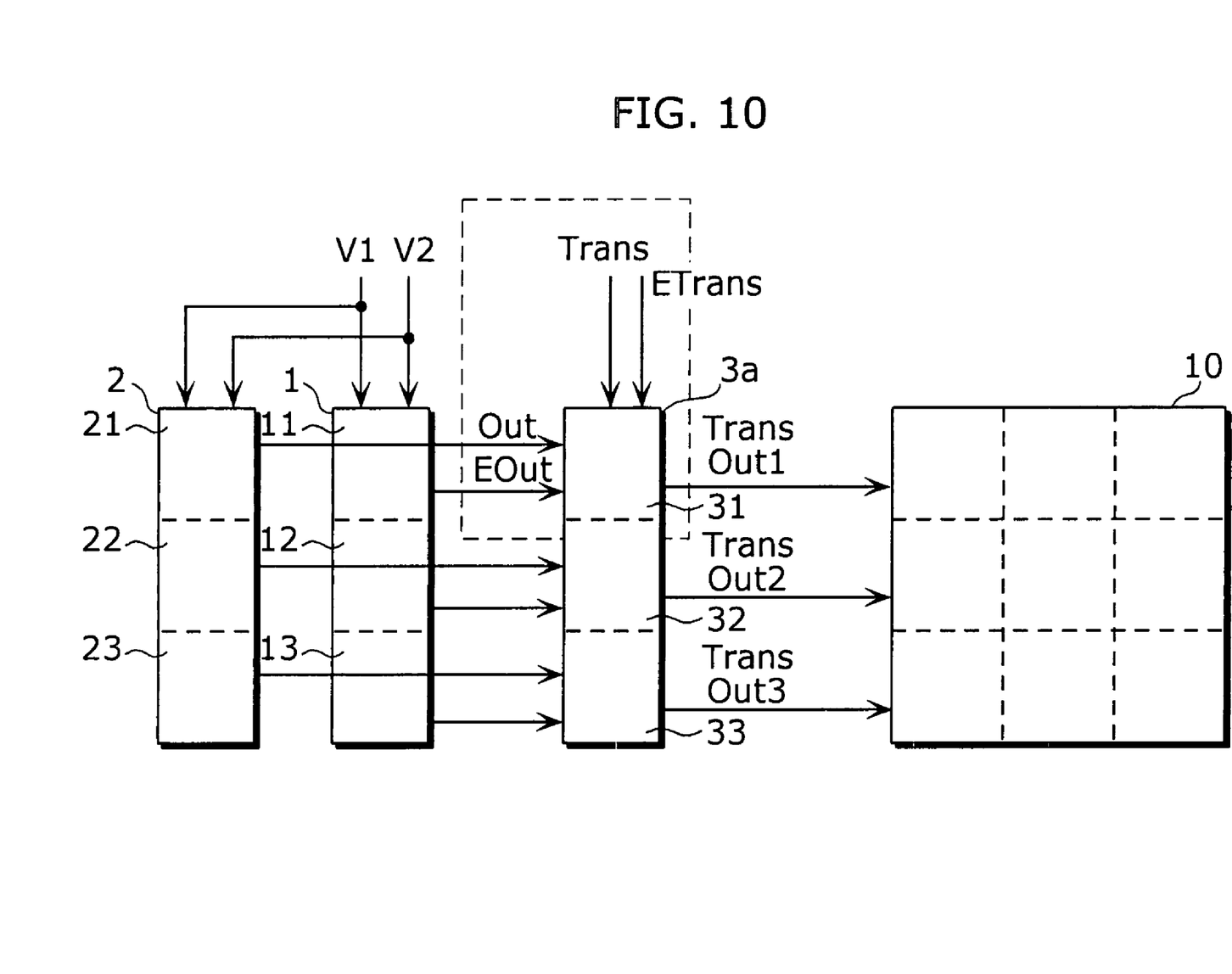
FIG. 10 shows a schematic structure of the main part of the image sensor according to a third embodiment.

FIG. 10 is a diagram showing the schematic structure of the main part of the image sensor according to the third embodiment. The structure shown in the diagram is different from the one shown in FIG. 4 in the respect that it includes a selection circuit 3a instead of the selection circuit 3. The selection circuit 3a does not require the clock signal Clk, which is different from the selection circuit 3a. The following focuses on the difference and the description for components which are the same is omitted.

Figure 11:
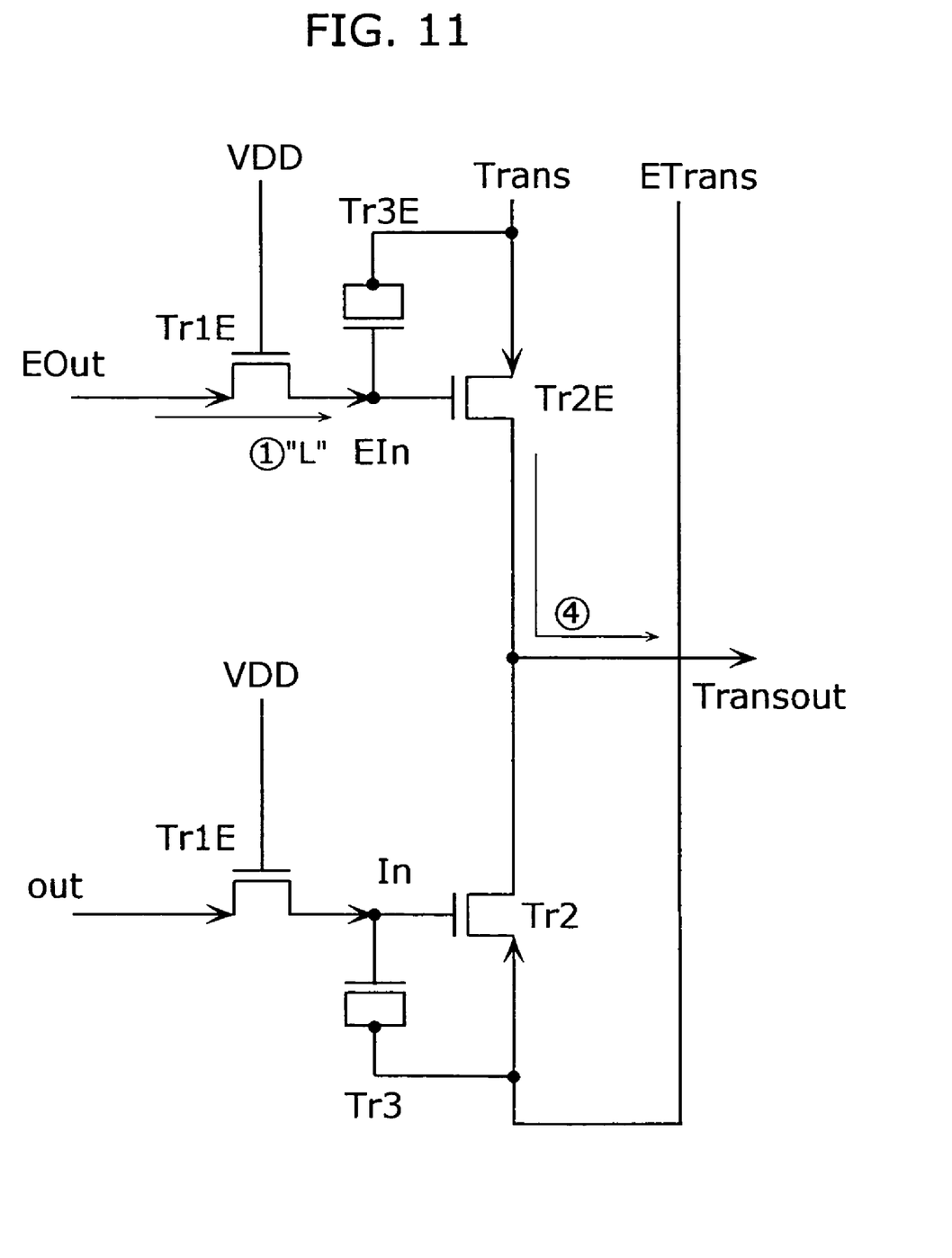
FIG. 11 is a circuit diagram showing the structure of the selection circuit.

FIG. 11 is a circuit diagram showing the structure of the selection circuit 3a. The power supply VDD, instead of the clock signal Clk, is connected to the gate of the switching transistor Tr1E.

Figures 12A, 12C:
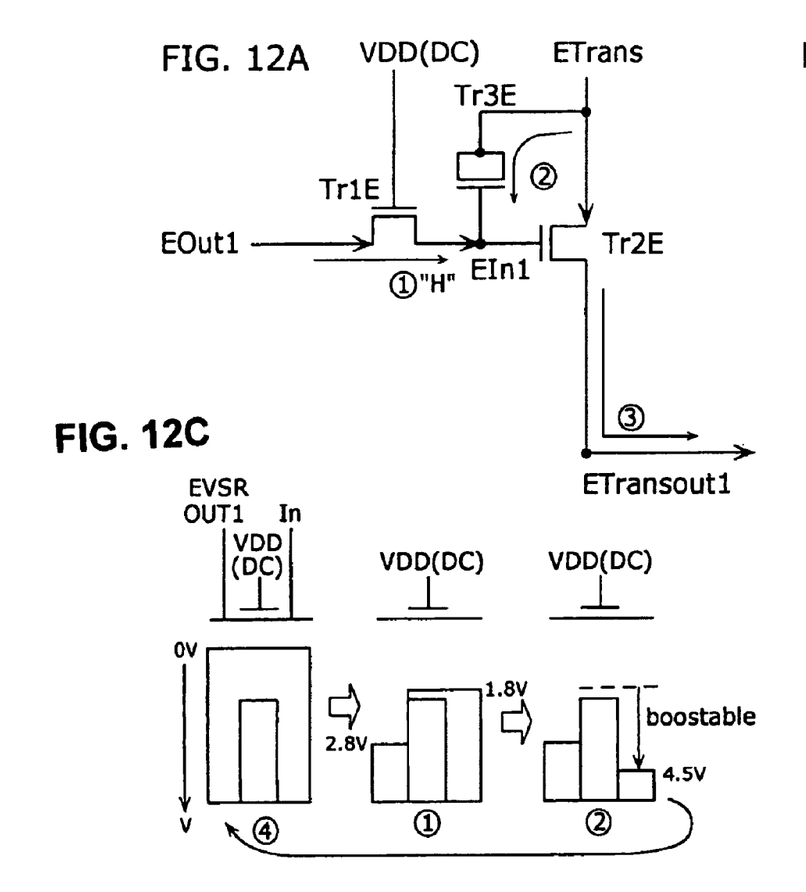
FIG. 12A~12C are diagrams showing an operation performed by the selection circuit.
Figure 12B:
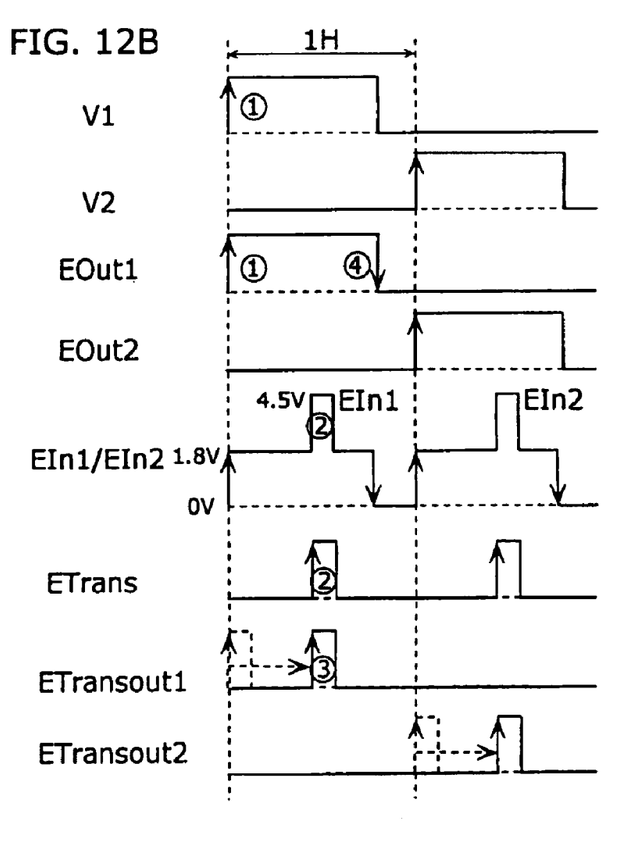

FIGS. 12A~12C are illustrations showing the operation of the selection circuit 3a. As in the second embodiment, the pulse durations of the clock signals V1, V2 are widened to make up a great part of one horizontal scanning period. It thus solves the problem that the boosting cannot be operated in the switching transistor Tr1E because the threshold is too low, as shown in FIG. 12C.

The switching transistor Tr1E is always ON because the power supply VDD is applied to the gate of the switching transistor Tr1E. The switching transistor Tr1E operates in a weak-inversion state (not completely ON between the source and the drain) since the output signal EOut is at a high level when the signal is boosted, therefore, the boosting operation can be performed. In this way, together with the widening of the pulse duration for the EOut signal, the boosting operation can be performed and the clock signal Clk is made unnecessary.

As described above, with the image sensor according to the third embodiment, the selection signal for electronic shutter use can be outputted to the sensor unit 10 at an arbitrary timing within one horizontal scanning period. A low power supply can be facilitated by setting the threshold of the boosting transistor Tr2E for boosting as the one higher than that of the switching transistor Tr1E.

It should be noted that each of the embodiments describes the case of using two scanning circuits, but the number of the circuits can be more than or equal to three. In this case, a bootstrap circuit may be placed for each of the output signals outputted from plural scanning circuits, and the respective outputs from each of the bootstrap circuits are connected to be outputted to the sensor unit 10, as a selected output signal.

Each of the above embodiments also explains the bootstrap circuit placed in the scanning circuit 2 for electronic shutter use. The structure of the bootstrap circuit placed in the scanning circuit 1 for outputting a normal selection signal is the same as that of the bootstrap circuit in the scanning circuit 2 so that the timing to output the Trans signal from the bootstrap circuit in the scanning circuit 1 can be arbitrary within one horizontal scanning period.

It should be noted that in each of the above embodiments the enhancement-type transistor Tr3E is placed as a boost capacitor between the gate of the boosting transistor Tr2E and either a source or a drain which is used for inputting the ETrans signal. Instead, the boost capacitor may be placed between the gate of the boosting transistor Tr2E and either a source or drain which is used for outputting the ETransout signal.

The period during which the gate capacitor of the boosting transistor Tr2E holds the EIn signal at a high level may be arbitrary as long as it is within one horizontal scanning period. Even when the period is half of the horizontal scanning period, the ETrans signal can be applied as a drive pulse, provided that the period is within the holding period. In this case, it is preferable that the holding period is longer within one horizontal scanning period. This is because the range of the timing to apply the ETrans signal is widened.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. An image sensor comprising:
   a sensor unit having a plurality of pixels;
   a first scanning circuit for normal scanning, having a dynamic logic circuit for outputting one or more first selection signals for selecting pixels from among said plurality of pixels in said sensor unit;
   a second scanning circuit for use as an electric shutter having a dynamic logic circuit for outputting one or more second selection signals for selecting pixels from among said plurality of pixels in said sensor unit; and
   one or more selection circuits each configured to receive a first selection signal from among said one or more first selection signals and a second selection signal from among said one or more second selection signals each selection circuit comprising:
   a first bootstrap circuit configured to hold the received first selection signal, and to output a first AND signal obtained by performing a logical AND between the held first selection signal and a first drive signal thereby specifying a timing to output the first AND signal; and
   a second bootstrap circuit configured to hold the received second selection signal, and to output a second AND signal obtained by performing a logical AND between the held second selection signal and a second drive signal thereby specifying a timing to output the second AND signal,
   wherein each selection circuit of said one or more selection circuits outputs the first AND signal and the second AND signal to said sensor unit,
   wherein each first bootstrap circuit includes:
      a first switch connected to a selection signal line from said first scanning circuit;
      a first boosting transistor for holding the received first selection signal in a gate capacitor, said first boosting transistor having a drain, a source, and a gate; and
      a first capacitative element for boosting a gate voltage in said first boosting transistor,
   wherein each second bootstrap circuit includes:
      a second switch connected to a selection signal line from said second scanning circuit;
      a second boosting transistor for holding the received second selection signal in a gate capacitor, said second boosting transistor having a drain, a source, and a gate; and
      a second capacitative element for boosting a gate voltage in said second boosting transistor,
   wherein said first boosting transistor in each first bootstrap circuit outputs the first AND signal from one of said drain and said source of said first boosting transistor by an input of the first drive signal to the other of said drain and said source of said first boosting transistor,
   wherein said second boosting transistor in each second bootstrap circuit outputs the second AND signal from one of said drain and said source of said second boosting transistor by an input of the second drive signal to the other of said drain and said source of said second boosting transistor, and
   wherein, in each selection circuit, said one of said drain and said source of said first boosting transistor is connected to said one of said drain and said source of said second boosting transistor to output the first AND signal and the second AND signal to said sensor unit.

2. The image sensor according to claim 1,
   wherein, in each selection circuit, said first capacitative element is connected between either said drain or said source of said first boosting transistor and said gate of said first boosting transistor, and
   wherein, in each selection circuit, said second capacitative element is connected between either said drain or said source of said second boosting transistor and said gate of said second boosting transistor.

3. The image sensor according to claim 1,
   wherein, in each selection circuit, at least one of said first capacitative element and said second capacitative element is a gate capacitor of an enhancement-type transistor having a drain and a source, and said drain and said source are short-circuited.

4. The image sensor according to claim 1,
   wherein, in each selection circuit, said first switch transmits the received first selection signal to said gate of said first boosting transistor when said first switch is turned on, and said second switch transmits the received second selection signal to said gate of said second boosting transistor when said second switch is turned on, and wherein, in each selection circuit, at least one of said first switch and said second switch transmits at a time when one horizontal scanning period shifts to another horizontal scanning period.

5. The image sensor according to claim 1, wherein, in each selection circuit, at least one of said first switch and said second switch is a switching transistor, and wherein, in each selection circuit, a threshold of a gate voltage to turn on said switching transistor is lower than a threshold of a gate voltage to turn on a respective one of said first boosting transistor and said second boosting transistor.

6. The image sensor according to claim 1, wherein at least one first selection signal of the one or more first selection signals is at a high level during a portion of a horizontal scanning period in which the at least one first selection signal is held, and wherein at least one second selection signal of the one or more second selection signals is at a high level during a portion of a horizontal scanning period in which the at least one second selection signal is held.

7. The image sensor according to claim 6, wherein, in each selection circuit, at least one of said first capacitative element and said second capacitative element is a gate capacitor of an enhancement-type transistor having a drain and a source, and said drain and said source are short-circuited.

8. The image sensor according to claim 6, wherein at least one of the received first selection signal and the received second selection signal is a pulse having an arbitrary width, and the pulse is output using a drive pulse having the arbitrary width.

9. The image sensor according to claim 6, wherein, in each selection circuit, said first switch transmits the received first selection signal to said gate of said first boosting transistor when said first switch is turned on, and said second switch transmits the received second selection signal to said gate of said second boosting transistor when said second switch is turned on, and wherein, in each selection circuit, at least one of said first switch and said second switch transmits at a time when one horizontal scanning period shifts to another horizontal scanning period.

10. The image sensor according to claim 6, wherein, in each selection circuit, at least one of said first switch and said second switch is a switching transistor, and wherein a threshold of a gate voltage to turn on said switching transistor is lower than a threshold of a gate voltage to turn on a respective one of said first boosting transistor and said second boosting transistor.

11. The image sensor according to claim 6, wherein said first scanning circuit outputs the one or more first selection signals at a high level by use of a drive pulse that is at a high level, and wherein said second scanning circuit outputs the one or more second selection signals at a high level by use of a drive pulse that is at a high level.

12. The image sensor according to claim 11, wherein, in each selection circuit, at least one of said first switch and said second switch is a switching transistor, and wherein a threshold of a gate voltage to turn on said switching transistor is lower than a threshold of a gate voltage to turn on a respective one of said first boosting transistor and said second boosting transistor.

13. The image sensor according to claim 12, wherein each switching transistor transmits at least one of the received first selection signal and the received second selection signal to said gate of a respective one of said first boosting transistor and said second boosting transistor when said switch is turned on at a time when one horizontal scanning period shifts to another horizontal scanning period.

14. A method for driving the image sensor according to claim 1, the method comprising:

a holding step of holding, in the second bootstrap circuit of a selection circuit of the one or more selection circuits, the received second selection signal outputted from the second scanning circuit during one horizontal scanning period;

an output step of outputting, to the sensor unit of the selection circuit of the one or more selection circuits, an AND signal obtained by performing a logical AND between the received second selection signal held in the second bootstrap circuit and a second drive signal that specifies a timing to output the AND signal to the sensor unit, a holding step of holding, in the first bootstrap circuit of the selection circuit of the one or more selection circuits, the received first selection signal outputted from the first scanning circuit during one horizontal scanning period; and an output step of outputting, to the sensor unit of the selection circuit of the one or more selection circuits, an AND signal obtained by performing a logical AND between the received first selection signal held in the first bootstrap circuit and a first drive signal that specifies a timing to output the AND signal to the sensor unit.

15. A camera comprising:

a housing; and the image sensor according to claim 1.

* * * * *

UNITED STATES PATENT AND TRADEMARK OFFICE
CERTIFICATE OF CORRECTION

PATENT NO. : 7,619,673 B2  
APPLICATION NO. : 10/814185  
DATED : November 17, 2009  
INVENTOR(S) : Murakami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Fourteenth Day of December, 2010

David J. Kappos  
*Director of the United States Patent and Trademark Office*